United States Patent [19]

Zaderej

[11] Patent Number: 4,468,604
[45] Date of Patent: Aug. 28, 1984

[54] MOTOR STARTING CIRCUIT

[76] Inventor: Andrew Zaderej, 4016 N. Home St., Mishawaka, Ind. 46545

[21] Appl. No.: 354,539

[22] Filed: Mar. 4, 1982

Related U.S. Application Data

[63] Continuation-in-part of Ser. No. 179,678, Aug. 20, 1980, abandoned.

[51] Int. Cl.$^3$ ............................................. H02P 1/42
[52] U.S. Cl. .................................... 318/786; 318/779
[58] Field of Search ............... 318/785, 786, 789, 790, 318/816, 817

[56] References Cited

U.S. PATENT DOCUMENTS

| | | | |
|---|---|---|---|
| 3,389,315 | 6/1968 | Andreas et al. | 318/779 |
| 3,777,232 | 12/1973 | Woods et al. | 318/786 |
| 3,819,994 | 6/1974 | Ballman | 318/786 |

Primary Examiner—David Smith, Jr.
Attorney, Agent, or Firm—James D. Hall

[57] ABSTRACT

A motor starting circuit in which a triac connected in series with the starting winding of the motor is gated into conduction for only a preselected time period following motor start-up. A switching circuit, in parallel with the serially connected triac and starting winding, includes a first SCR which provides a low resistance signal path to the gate of the triac at such time that the first SCR is in a conducting state. The first SCR is gated by a resistance network and the time period is established by an RC circuit which gates a second SCR, at the end of the selected time period, to short out the portion of the resistance network to which the gate of the first SCR is connected so as to turn off the first SCR and leave a high resistance path through the switching circuit to the gate of the triac.

15 Claims, 5 Drawing Figures

MOTOR STARTING CIRCUIT

CROSS REFERENCE TO RELATED APPLICATION

This is a continuation-in-part of application, Ser. No. 179,678, filed Aug. 20, 1980, now abandoned.

BACKGROUND OF THE INVENTION

1. Field of the Invention

The prsent invention relates generally to circuits for starting single-phase, alternating current induction electric motors and, more particularly, but not by way of limitation, to circuits which momentarily energize a field winding in such motors.

2. Brief Discussion of the Prior Art

The operation of an induction electric motor generally requires that electrically induced magnetic fields in the motor vary in direction with time. Where multiple phase electric power is available, this requirement is easily met by arranging field windings, each energized at a different phase, about the rotor of the motor such that the magnetic fields produced by the individual field, or main, windings add vectorially to produce a rotating magnetic field which the rotor follows. Single-phase motors, on the other hand, generally require some other scheme, at least during a short period following start-up, to cause windings in the motor to produce magnetic fields having a rotational character. Once started, the rotating rotor will itself give rise to induced magnetic fields such that a two-pole field winding is capable of maintaining the rotation of the rotor and transmitting torque thereto so that the motor can do useful work. Among the various schemes for starting a motor is the inclusion of a starting winding which is energized for only a short period of time following start-up to permit the motor to be brought up to operating speed and which is thereafter de-energized. Both the commercially available split-phase and capacitor start motors use such a scheme.

In the past, it has been standard practice to use a centrifugal switch to energize the starting winding for the short period following start-up. Such switches are connected in series with the starting windings of motors and are of the normally closed type. They are mounted on the rotors of the motors and their contacts are arranged so that a centrifugal force on the mounting for one contact will be thrown radially outwardly, away from the other contact, when the rotor upon which such a switch is mounted reaches a preselected speed of rotation.

While centrifugal switches have thus provided a simple means for momentarily energizing the starting winding of a motor, their use has not been without problems. These switches are fairly expensive and they have only a limited lifetime. That is, the switch must be replaced after a number of make and break operations. This lifetime limitation can be an important economic factor where a motor is used in an application in which the motor is repetitively operated at frequent intervals.

SUMMARY OF THE INVENTION

The present invention replaces centrifugal switches now used in electric motors with a motor starting circuit which does not require the making and breaking of contacts and accordingly, generally has a much longer lifetime than centrifugal switches currently available. Moreover, the motor starting circuit of the present invention can generally be manufactured at a lower cost than the cost of a centrifugal switch and associated equipment necessary to make use of a centrifugal switch to momentarily energize the starting winding of a motor. Thus, for example, the motor starting circuit of the present invention does not require any electrical connection between the starting winding and a component of the starting circuit on the rotor, as does a rotor-mounted centrifugal switch, so that slip-ring assemblies which must be used with centrifugal switches to connect these switches to the starting winding can be eliminated. Further, the motor starting circuit is readily adaptable to manufacture using monolithic solid-state technology so that a further reduction in cost can be realized by mass production of major portions of the motor starting circuit using such technology.

In the motor starting circuit of the present invention, the centrifugal switch is replaced with a triac and a switching circuit is provided to provide a gate signal to the triac during only a short period following the start-up of the motor. Thereafter, the switching circuit interposes a relatively large resistance into the triac gate circuit to prevent further gating of the triac into a conducting state as the applied voltage across the main terminals thereof varies sinusoidally with time. Thus, once the large resistance is interposed into the gate circuit of the triac, the triac will turn off to disconnect the starting winding from the source of electrical power for the motor.

An important object of the present invention is to provide a motor starting circuit having an extended lifetime in comparison with centrifugal switches currently used for motor starting purposes.

Another object of the present invention is to reduce the cost of systems used for starting single-phase, alternating current electric motors.

Other objects, advantageous and features of the present invention will become clear from the following detailed description of the preferred embodiments of the invention when read in conjunction with the drawings and appended claims.

DESCRIPTION OF FIG. 1

Figure 1:
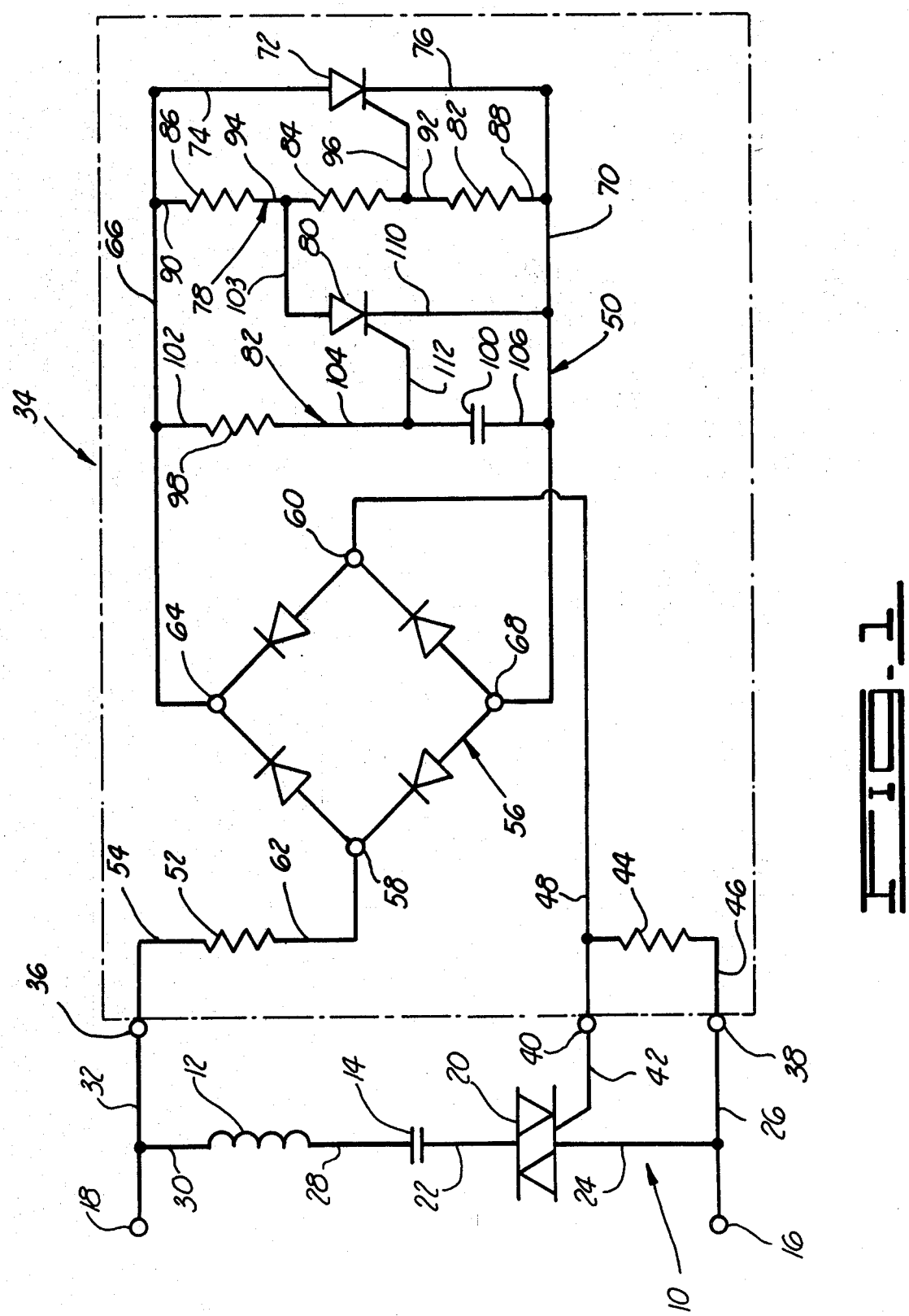
FIG. 1 is a schematic circuit diagram of the motor starting circuit of the present invention showing the connection of the motor starting circuit to the starting winding of a capacitor start motor.

Referring now to FIG. 1, shown therein and designated by the general reference numeral 10 is a schematic circuit diagram of a motor starting circuit constructed in accordance with the present invention. In order to show the manner in which the motor starting circuit is connected to a motor, FIG. 1 also includes a schematic representation of the starting winding 12 and starting capacitor 14 of a capacitor start motor, with which the motor starting circuit 10 can be used, and terminals 16 and 18 via which the starting winding 12 is supplied with electrical power. (As is known in the art, the terminals 16 and 18 can be the input terminals of the motor but such need not be the case.) The motor starting circuit 10 includes a triac 20 and, when the motor starting circuit 10 is used with a capacitor start motor, main terminal one of the triac is connected to one terminal of the capacitor 14 via a conductor 22 and main terminal two of triac 20 is connected to terminal 16 via conductors 24 and 26. The other terminal of capacitor 14 is connected, via conductor 28, to a first end of the starting winding 12 and the second end of the starting winding 12 is connected to terminal 18 via conductors 30 and 32. Thus, it will be seen that the triac 20 is serially connected, via its main terminals, to the starting winding 12 and capacitor 14 and that the serially connected triac 20, winding 12, and capacitor 14 are then connected across the terminals 16 and 18 which provide electrical power to the starting winding 12 when the motor of which winding 12 is a part is connected to an electrical power source.

As will be clear to those skilled in the art, the motor starting circuit 10 is not limited to use with capacitor start motors. For example, the motor starting circuit 10 can be used with a split-phase motor in which case main terminal one of triac 20 is connected directly to the first end of winding 12 and such motor does not include a starting capacitor such as capacitor 14. it will suffice for use of the motor starting circuit 10 that the motor with which it is used include a starting winding, such as the winding 12, and that triac 20 be serially interposed with such winding across the terminals which supply power for the starting winding. The starting winding 12, in a split phrase motor, or the combined starting winding 12 and starting capacitor 14, in a capacitor start motor, will sometimes be referred to herein by the generic term "starting winding circuit."

The motor starting circuit 10 further comprises a switching circut 34 which has a first input terminal 36 and a second input terminal 38 and the switching circuit 34 is connected in a parallel relation across the serially connected winding 12 and triac 20 (and capacitor 14 in a capacitor start motor) by connecting the first input terminal 36 to conductor 32 and the second input terminal 38 to conductor 26. (That is, first input terminal 36 is electrically connected to the end of winding 12 opposite the end thereof connected, via the capacitor 14 in the case of the capacitor start motor or directly in the case of a split-phase motor, to main terminal one of triac 20 and second input terminal 38 is electrically connected to main terminal two of triac 20.) The switching circuit 34 further has a gate terminal 40 which is connected to the gate of triac 20 via conductor 42.

The switching circuit 34 comprises a biasing resistor 44, which is connected between the second input terminal 38 and the gate terminal 40 via conductors 46 and 48, and a timing circuit 50 which includes a load resistor 52 connected to first input terminal 36 via a conductor 54. The resistors 44 and 52 are selected to have relatively low resistance values; that is, of the order of a few kilohms, so that should the end of resistor 52 opposite first input terminal 36 be connected directly to the gate terminal 40, a relatively low resistance path will be established between first input terminal 36 and the gate of triac 20 to gate triac 20 into a conducting state near the beginning of each half cycle of the alternating potential difference applied across the serially connected triac 20 and starting winding 12. In one preferred embodiment of the present invention, in which triac 20 is a Q4015LS/ER3789/4 triac manufactured by Teccor Electronics, Inc., Euless, Tex., the resistance values of resistors 44 and 52 can be 1,000 ohms and 800 ohms respectively.

The timing circuit 50 further comprises a conventional full-view rectifier bridge 56 having input terminals 58 and 60 which are connected, respectively, to the end of resistor 52 opposite first input terminal 36, via conductor 62, and to the gate terminal 40 of the switching circuit 34 via the conductor 48. A number of components are connected between the output terminals of rectifier bridge 56 so that, for purposes of illustration, the positive output terminal 64 of bridge 56 has been shown as connected to a bus 66 and the negative output terminal 68 of the bridge 56 has been shown as being connected to a bus 70. As will be clear to those skilled in the art, a short circuit between the buses 66 and 70; that is, between the output terminals of rectifier bridge 56, will form a direct connection, through bridge 56, between the end of resistor 52 opposite the first input terminal 36 and the gate terminal 40 so that, should the buses 66 and 70 be directly connected, the triac 20 will be gated to pass an alternating current through the starting winding 12 as has been discussed above. Moreover, since the output of bridge 56 will be a full-wave rectified sine wave when the applied volage across the terminals 18 and 20, which supply electrical power to the starting winding 12, is a sinusoidal alternating electric current, a connection approximating a short circuit can be formed between the buses 66 and 70 by means of an SCR connected between the buses 66 and 70 as has been shown in FIG. 1. As indicated therein, the anode of a first SCR 72 is connected to bus 66 via conductor 74 and the cathode of first SCR 72 is connected to bus 70 via conductor 76.

The timing circuit 50 further comprises a first SCR gating branch 78, a turn-off device 80 and a timing branch 82 which cause momentary gating of first SCR 72 to momentarily gate triac 20 when the motor containing the motor starting circuit 10 is started as will be discussed below. (As used herein, the term momentary means a short period of time which can be selected by the choice of components comprising the timing branch 82.) The turn-off device 80 is preferably the second SCR and has been illustrated as such in the drawings. However, as will be clear from the discussion to follow, the turn-off device 80 can be a transistor having a high current gain. In such case, the collector, emitter, and base of such transistor will be connected to remaining portions of the timing circuit 50 in the same manner as is shown in FIG. 1 for the anode, cathode, and gate respectively of the SCR embodiment of turn-off device 80.

The first SCR gating branch 78 is connected in parallel across the anode-cathode terminals of the first SCR 72 and comprises first, second and third gating branch resistors 82, 84, and 86 respectively. Specifically, one end of the first gating branch resistor 82 is connected to bus 70 via conductor 88; one end of third gating branch resistor 86 is connected to bus 66 via conductor 90 and the other ends of first gating branch resistor 82 and third gating branch resistor 86 are connected to opposite ends of second gating branch resistor 84 via conductors 92 and 94 respectively. For a purpose to be discussed below, the third gating branch resistor 86 is selected to have a relatively high resistance value as compared to the load resistor 52. In particular, in one preferred embodiment of the motor starting circuit 10, previously referred to, the resistance of third gating branch resistor has been selected to be 150 kilohms. The gate of first SCR 72 is connected to conductor 92, between first and second gating branch resistors 82 and 84 respectively, via a conductor 96.

The timing branch 82 is similarly connected in parallel across the anode-cathode terminals of first SCR 72 and comprises a timing resistor 98 in series with a timing capacitor 100. Specifically, one end of timing resistor 98 is connected to bus 66 by conductor 102; the other end of timing resistor 98 is connected to one terminal of timing capacitor 100 by a conductor 104; and the other terminal of timing capicator 100 is connected to bus 70 by conductor 106.

In the one preferred embodiment of the motor starting circuit 10 previously referred to, suitable values for the timing resistor 98 and timing capacitor 100 are one megohm and 22 microfarads respectively.

The turn-off device 80 is connected across the first and second gating branch resistors 82 and 84 to provide a short circuit across these resistors at such time that the turn-off device 80 is placed in a conducting state. Specifically, when the turn-off device 80 is chosen to be an SCR, the anode thereof is connected to the junction between the second gating branch resistor 84 and the third gating branch resistor 86, by a conductor 108, and the cathode thereof is connected to bus 70 via a conductor 110. The gate of the turn-off device, in such case, is connected to the junction between the timing resistor 98 and the timing capacitor 100 by a conductor 112. (When a transistor is used for the turn-off device 80, the conductors 108, 110, and 112 connect to the collector, emitter, and base of such transistor, respectively.)

OPERATION OF FIG. 1

At such time that electrical power is initially applied to a motor including the motor starting circuit 10; that is, at motor start-up, the timing capacitor 100 will generally be in an uncharged state. As will be clear to those skilled in the art, the timing capacitor 100 will discharge through the timing resistor 98 and the first SCR gating branch 78 between intervals of operation of the motor which includes the motor starting circuit 10.

When electrical power is applied to the motor, an alternating current signal appears across terminals 16 and 18 of FIG. 1 and, concurrently, appears across the input terminals 36 and 38 of the switching circuit 34 via the connection of first input terminal 36 to terminal 18 and second input terminal 38 to terminal 16. This alternating current signal is applied to the input terminals 58 and 60 of the full-wave rectifier bridge 56 via the load resistor 52, which is connected between the first input terminal 36 of the switching circuit 34 and input terminal 58 of bridge 56, and via the biasing resistor 44 which is connected between the second input terminal 38 of the switching circuit 34 and the input terminal 60 of bridge 56, so that a full-wave rectified, sinusoidal signal is developed across the output terminals 64 and 68 of the bridge 56. Since, at the time electrical power is applied to the motor, timing capacitor 100 is uncharged, the gate (or base) of turn-off device 80 will be at the same potential as the cathode (emitter) thereof and turn-off device 80 will, accordingly, initially be in a nonconducting state. Thus, the output of bridge 56 is divided across the first SCR gating branch 78 so that a small electrical potential appears across the first gating branch resistor 82; that is, between the gate and cathode of first SCR 72. This small electrical potential gates SCR 72 into a conducting state to provide, as a practical matter with respect to gating of triac 20, a short circuit between buses 66 and 70. The first and second gating branch resistors 82 and 84 are selected such that only a very small output voltage from the bridge 56 will suffice to develop a sufficient voltage across the first gating branch resistor 82 with the result that, so long as turn-off device 80 remains in a nonconducting state, first SCR 72 will turn on substantially immediately as each half cycle of the alternating potential applied across terminals 16 and 18 commences. In the preferred embodiment previously referred to, such operation can be obtained, where the first SCR 72 is a CR 203D manufactured by Raytheon Company of Lexington, Mass., by making the resistances of the first and second branching gate resistors 82 and 84 one kilohm and 20 kilohms respectively. Thus, so long as the turn-off device 80 remains in a nonconducting state, the timing circuit 50 acts as a low resistance path between the first input terminal 36 of the switching circuit 34, such path having an effective resistance slightly larger than the resistance of the load resistor 52, and the gate of triac 20. (As will be clear to those skilled in the art, the anode-cathode potential difference across SCR 72, during conduction thereby, while nonzero, will be small compared to the amplitude of the electrical potential difference applied across terminals 16 and 18 so that, as regards gating of triac 20, SCR 72 can be treated as a short circuit during such time that SCR 72 is in a conducting state.) The result is that triac 20 turns on substantially immediately with the commencement of each half cycle of the applied alternating current signal to act as a closed switch connected in series with the starting winding 12.

Concurrently with the application of the output of bridge 56 to the first SCR gating branch 78, such output is applied to the timing branch 82 to commence charging of the timing capacitor 100. At some point in time, depending on the selection of the components of the timing branch 82, a sufficient potential will appear across the timing capacitor 100 to cause turn-off device 80 to make a transition to a conducting state. (It will be clear to those skilled in the art that capacitor 100 will charge during conduction by SCR 72 because of the anode-cathode potential across SCR 72. In order that the charge on capacitor 100 becomes sufficient to effect a transition of turn-off device 80, turn-off device 80 is slected to require only a very small gating current. An example of such a device is the CR203J SCR manufactured by Raytheon Company.) Because of the connection of turn-off device 80 across the first and second gating branch resistors 82 and 84, the result of conduction by turn-off device 80 is to greatly reduce the current through the first gating branch resistor 82 with a concomitant reduction in the gate-cathode potential applied to the first SCR 72. Thus, first SCR 72 will no longer be gated into a conducting state at the commencement of each half cycle of the applied alternating current signal across the terminals 16 and 18. Rather, first SCR 72 acts as an open circuit between buses 66 and 70 so that the current transmitted to the gate of triac 20 will pass, via turn-off device 80, through the third gating branch resistor 86. Since, as noted above, the resistance of the third gating branch resistor 86 is selected to be large in comparison with the resistance of load resistor 52, the timing circuit 50 acts as a relatively high resistance path connecting the first input terminal of the switching circuit 34 to the gate of triac 20, such path having an effective resistance slightly larger than the combined resistances of the third gating branch resistor 86 and the load resistor 52. Thus, by selecting the third gating branch resistor 86 to have a much higher resistance than the load resistor 52, the gate current of triac 20 can be limited, following the transition of turn-off device 80 to a conducting state, to a value insufficient to gate triac 20 into a conducting state so that triac 20 acts as an open switch following such transition. Accordingly, the starting winding 12 is momentarily energized following start-up of the motor of which it is a part; that is, starting winding 12 is energized for the selected period of time required to charge timing capacitor 100 to a value sufficient to cause turn-off device 80 to conduct and is not energized thereafter. As is known in the art, the required time of energization of the starting winding 12 of a motor will vary from one type of motor to another. However, since such times are known and since the time for causing turn-off device 80 to conduct can be selected by appropriate selection of the timing resistor 98 and the timing capacitor 100, the motor starting circuit 10 can be mated to substantially any type of single-phase, alternating current motor which includes a starting winding which is energized for only a short period of time following motor start-up.

DESCRIPTION OF FIG. 2

Figure 2:
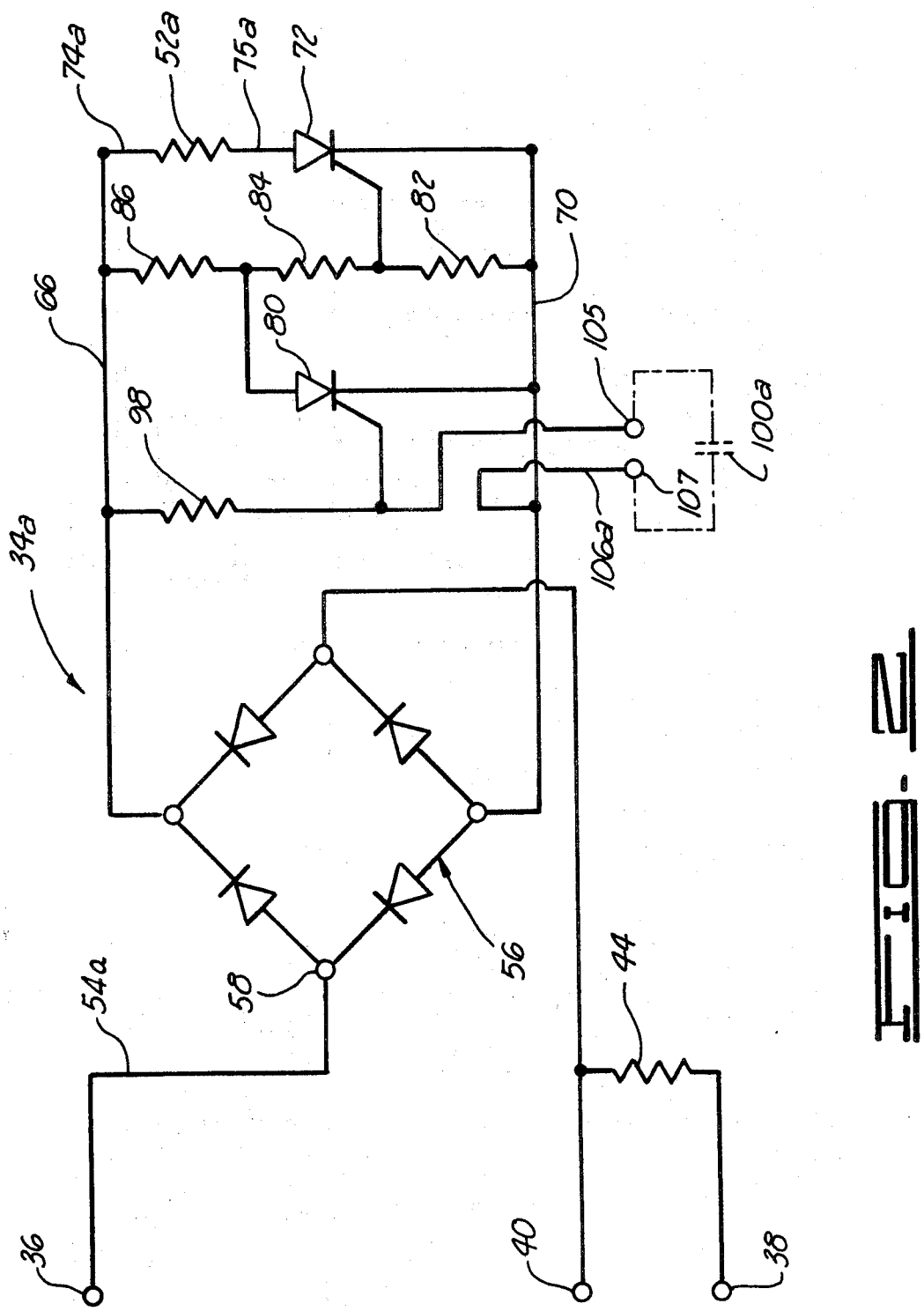
FIG. 2 is a schematic circuit diagram of a second embodiment of the switching circuit of the motor starting circuit which is particularly suited to manufacture using monolithic, solid state technology.

Referring now to FIG. 2, shown therein and designated by the numeral 34a is the switching circuit of a modified motor starting circuit which is particularly suited for manufacture using monolithic, solid state technology. In FIG. 2, components which are identical to components of the starting circuit 34 and which are disposed in switching circuit 34a in the same manner that the components of the starting circuit 34 are disposed therein, have been designated by the same numbers as have been used for such identical components in FIG. 1. The switching circuit 34a differs from switching circuit 34 in several respects. In particular, the load resistor 52 of switching circuit 34 has been replaced by a load resistor 52a connected between the anode of the first SCR 72 and bus 66 via conductors 74a and 75a and first switching terminal 36 is connected directly to input terminal 58 of bridge 56 by conductor 54a. Similarly, since it is contemplated that the components of switching circuit 34a that are shown in solid lines in FIG. 2 will be formed on a silicon chip, conductor 106, used in switching circuit 34 to connect one end of timing capacitor 100 to bus 70 is, in switching circuit 34a, replaced by a conductor 106a which is connected to bus 70 and terminates in a terminal 107 on the silicon chip upon which the components shown in solid lines in FIG. 2 are formed. Similarly, conductor 104 of switching circuit 34 is replaced by conductor 104a which terminates in a terminal 105. A timing capacitor, designated 100a in FIG. 2 and shown in phantom lines therein, can then be introduced into the timing circuit 34a by connection of the capacitor 100a across terminals 105 and 107. The operation of a motor starting circuit including the switching circuit 34a is substantially identical to that of a motor starting circuit including the switching circuit 34. It will be noted that the high resistance path between the first input terminal 36 of switching circuit 34a, after conduction by turn-off device 80 commences, will be substantially the resistance of the third gating branch resistor 86 rather than the combined resistances of the third gating branch resistor and the load resistor.

DESCRIPTION OF FIG. 3

Figure 3:
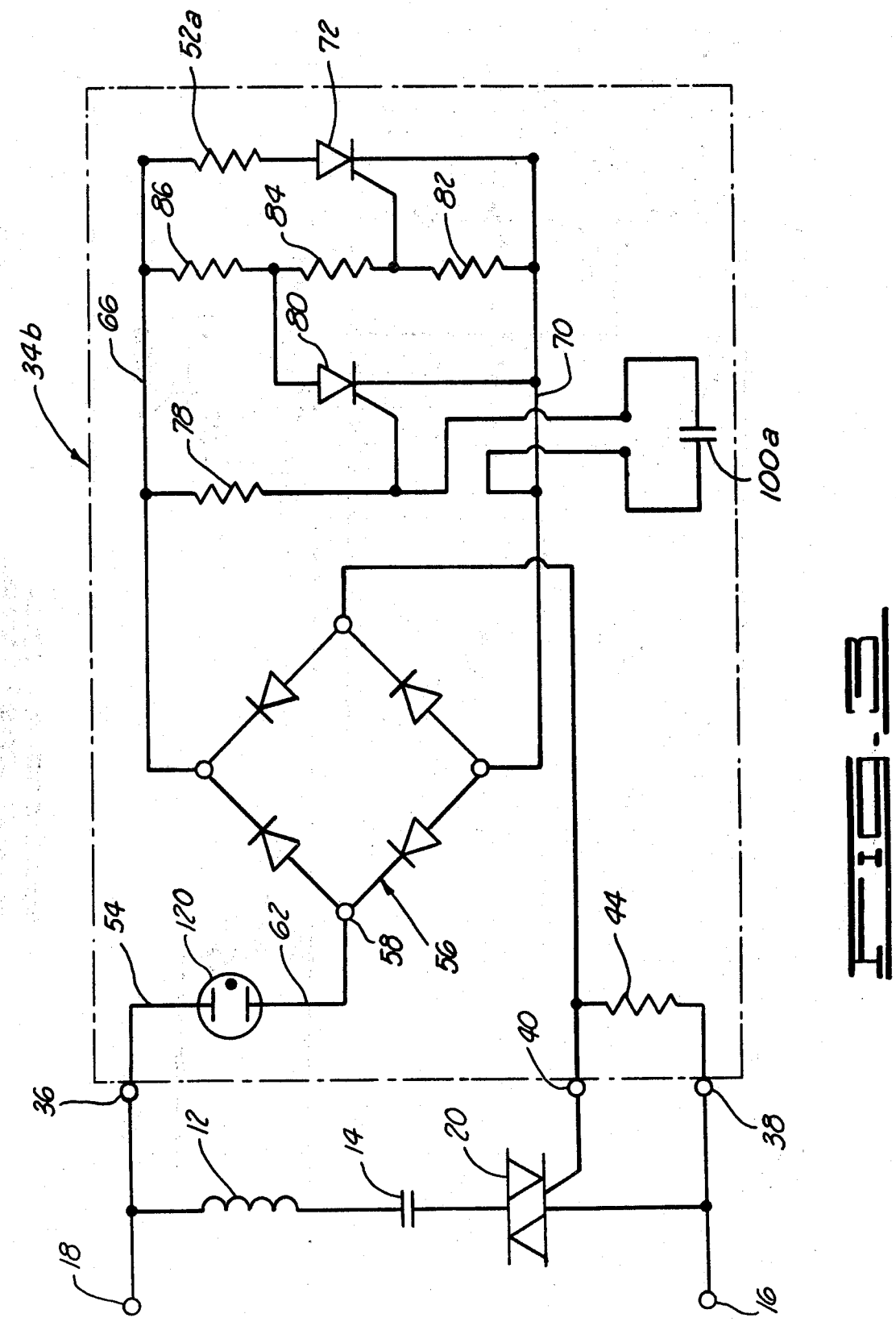
FIG. 3 is a schematic circuit diagram similar to the diagram in FIG. 1 showing a third embodiment of the motor starting circuit.

FIG. 3 is a third embodiment of the motor starting circuit of the present invention showing a further modification of the switching circuit, designated by the numeral 34b in FIG. 3. As in the case of the modified switching circuit 34a, the load resistor 52a has been placed between the anode of first SCR 72 and bus 66 in the switching circuit 34b. However, unlike the case for the modified switching circuit 34a, the input terminal 58 of bridge 56 is not connected directly to the first input terminal 36 of the switching circuit 34b. Rather, as in the case with the switching circuit 34, the switching circuit 34b includes conductors 54 and 62 in the connection between the input terminal 58 of bridge 56 and first input terminal 36 of switching circuit 34b. These conductors are used to connect a voltage limiter 120 between the first input terminal 36 of switching circuit 34b and input terminal 58 to limit the voltage applied to remaining components of the switching circuit 34b. A suitable voltage limiter for use in switching circuit 34b is an NE-2 glow discharge tube and voltage limiter 120 has been drawn as a glow discharge tube in FIG. 3. However, it will be clear that voltage limiter 120 can be any device; for example, a back-to-back zener diode pair, which has V-I characteristics similar to those of a glow discharge tube each as the NE-2. Such inclusion of a voltage limiter is advantageous where it is desired to use monolithic, solid state technology in the manufacture of the switching circuit of the motor starting circuit and the motor starting circuit is to be used with a motor for which the applied voltage exceeds the safe operating voltage of a circuit manufactured using such technology. In this case, all components of the switching circuit 34b, except for the voltage limiter 120 and the timing capacitor, can be formed on a silicon chip to which the timing capacitor and the voltage limiter can then be connected as shown in FIG. 3. The operation of a motor starting circuit including the switching circuit 34b is, as in the case for a motor starting circuit including a switching circuit 34a, substantially identical to the operation of a motor starting circuit including the switching circuit 34.

DESCRIPTION OF FIG. 4

Figure 4:
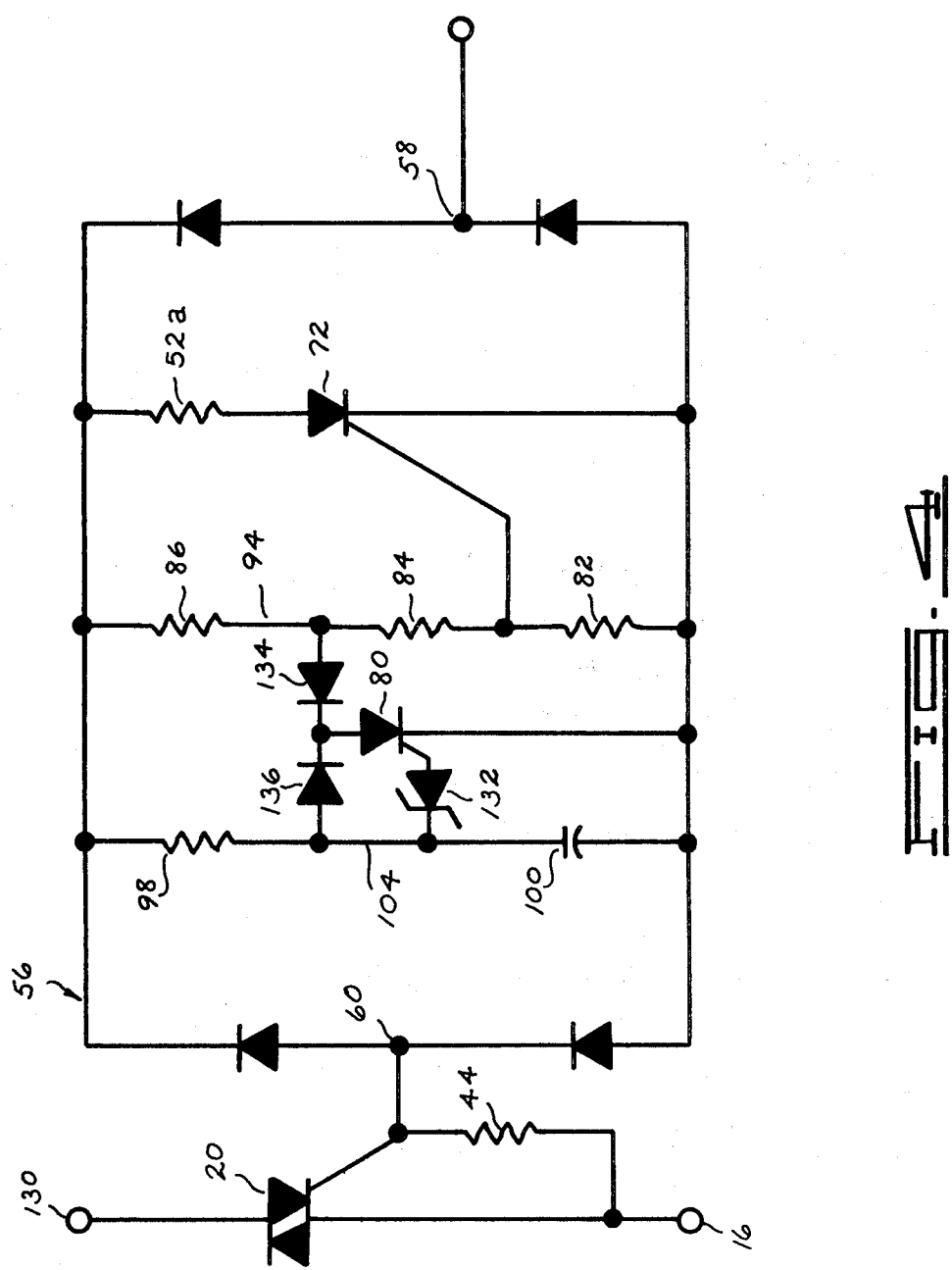
FIG. 4 is a schematic circuit diagram showing a fourth embodiment of the motor starting circuit.

FIG. 4 is a fourth embodiment of the motor starting circuit of the present invention showing a further modification of the switching circuit. Terminal 16 and terminals 58 and 60 of full-wave rectifier bridge 56 correspond in function and essential location to the circuit shown in FIG. 1. Although not shown, the motor starting circuit will include starting winding 12 and starting capacitor 14 connected in series between terminal 58 and terminal 130 shown in the circuit of FIG. 4. Timing resistor 98 and timing capacitor 100, turn-off device or SCR 80, gating branch resistors 82, 84, and 86, short circuit switch or SCR 72, load resistor 52a, biasing resistor 44 and triac 20 are similarly connected to perform the same function as described for the circuits of FIGS. 1, 2, and 3. A zener diode 132 is located between the gate of SCR 80 and conductor 104 which extends between resistor 98 and capacitor 100. The anode of diode 132 is connected to the gate of SCR 80 and the cathode of the diode is connected to conductor 104. A diode 134 is connected in the mode shown between the anode of SCR 80 and conductor 94 extending between resistors 84 and 86. Another diode 136 is connected in the mode shown between the anode of SCR 80 and conductor 104.

Diodes 134 and 136 provide current isolation during the charging of capacitor 100 and the subsequent discharge of the capacitor when short circuit switch or SCR 72 is turned off. Capacitor 100 will discharge through diode 136 and SCR 80 with diode 134 performing a signal blocking function. After turn-off device or SCR 80 is switched on, current flow passes through diode 134 with diode 136 acting in a signal blocking capacity. Zener diode 132 between the gate of SCR 80 and timing capacitor 100 regulates the charging rate of the capacitor and permits the usage of a smaller size capacitor with a resulting more accurate repeatability and recovery rate for the capacitor.

In operation, upon the application of electrical power applied to the motor, short circuit switch or SCR 72 is switched on to gate or turn on triac 20 with the resulting current signal being applied through starting winding 12 (not shown in FIG. 4). After a selected time duration to bring the motor up to operating speed, the timing capacitor 100 is charged and the brakedown point of zener diode 132 exceeded to turn SCR 80 on. This, as explained previously in the description of the embodiments of FIGS. 1-3, causes SCR 72 to be turned off thereby reducing the gate current to triac 20 sufficiently to switch the triac into a nonconducting state which in turn terminates the current signal through starting winding 12.

DESCRIPTION OF FIG. 5

Figure 5:
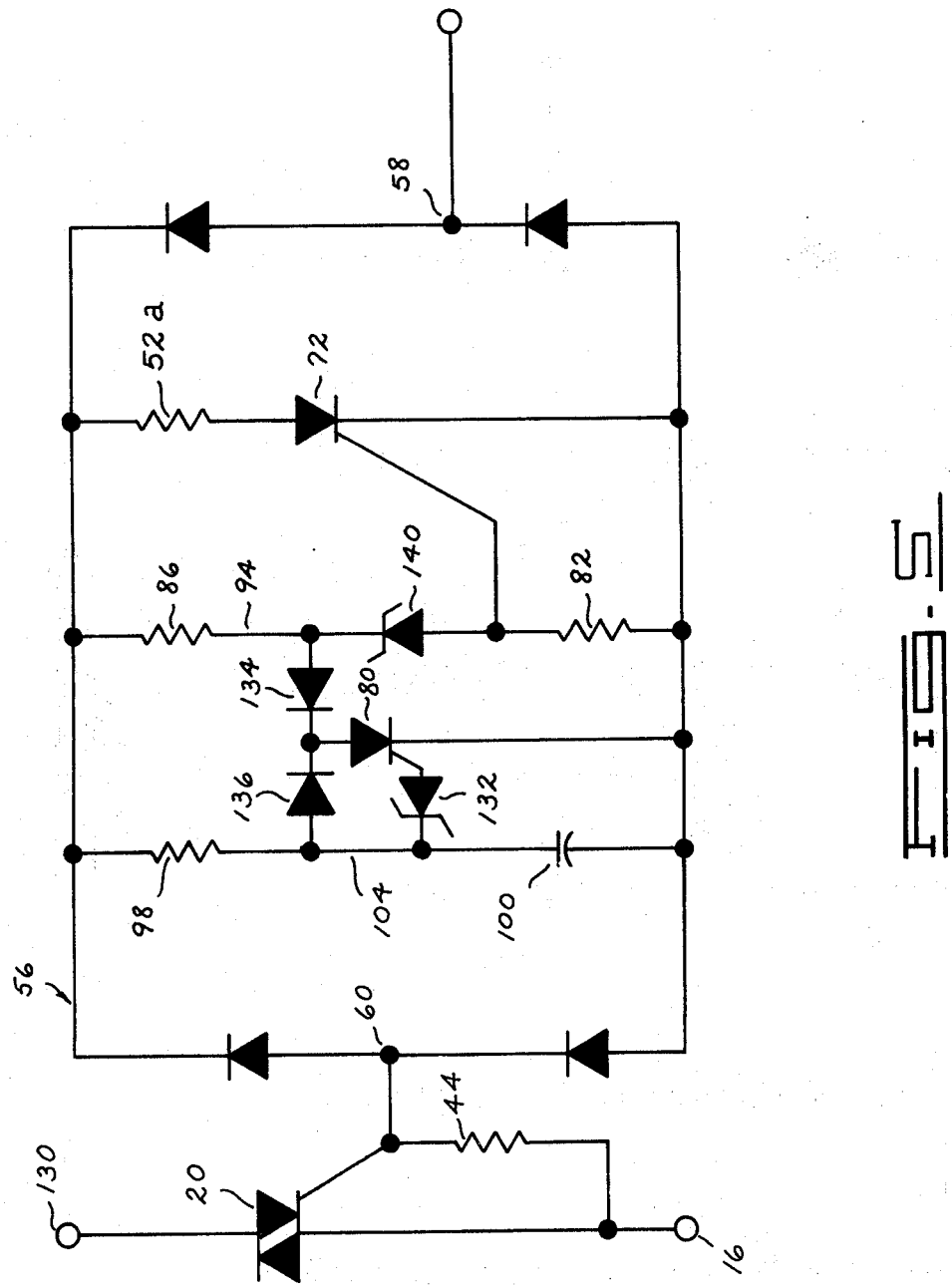
FIG. 5 is a schematic circuit diagram showing a fifth embodiment of the motor starting circuit.

FIG. 5 is a fourth embodiment of the motor starting circuit of the present invention showing a further modification of the switching circuit. This circuit is like the circuit of FIG. 4 in function and components except a zener diode 140 in the mode shown replaces gating branch resistor 84. Zener diode 140 improves the performance of the circuit by making it less sensitive to power input or line voltage changes and by allowing more rapid turn-off of SCR 80 after motor turn-off. The basic functional operation of this circuit is like that of FIG. 4.

It is to be understood that the invention is not to be limited to the details above given, but may be modified within the scope of the appended claims.

What is claimed is:

1. A motor starting circuit for momentarily energizing the starting winding circuit of a single-phase, alternating current motor, comprising:
   a triac connected, via the main terminals thereof, in series with said starting winding circuit; and
   a switching circuit having first and second input terminals and a gate terminal, wherein the switching circuit is connected, via the input terminals thereof, in parallel with the serially connected triac and starting winding circuit, the second input terminal of the switching circuit being connected to a main terminal of the triac with the opposite main terminal thereof connected to the starting winding circuit, wherein the gate terminal of the switching circuit is connected to the gate of the triac, and wherein the switching circuit comprises:
   a biasing resistor connected between the gate terminal and the second input terminal of the switching circuit, and
   timing means, connected between the first input terminal of the switching circuit and the gate terminal thereof for establishing a relatively low effective resistance between the first input terminal and the triac gate for a preselected time period following connection of the motor to an electrical source and thereafter establishing a relatively high effective resistance between the first input terminal and the triac gate, said timing means including:
   a load resistor having one end thereof connected to the first input terminal of the switching circuit;
   a full-wave recifier bridge having the input terminals thereof connected between the other end of the load resistor and the gate terminal of the switching circuit;
   a first SCR connected in parallel across the output terminals of the rectifier bridge so as to substantially provide a short circuit between the load resistor and the gate terminal of the switching circuit at such time that the first SCR is in a conducting state;
   a first SCR gating branch, comprising:
   a first gating branch resistor connected between the cathode and gate of said first SCR;
   a second gating branch resistor having one end thereof connected to the junction of the first gating branch resistor and a gate of said first SCR; and
   a third gating branch resistor connected between the other end of the second gating branch resistor and the anode of said first SCR, wherein the third gating branch resistor has a resistance which is large in relation to the resistance of the load resistor;
   a timing branch, comprising:
   a timing resistor having one end thereof connected to the anode of said first SCR; and
   a timing capacitor connected between the other end of the timing resistor and the cathode of said SCR for charging through the timing resistor; and
   turn-off means, connected between the junction of the timing resistor and timing capacitor, the junction of the second and third gating branch resistors, and the junction of the first gating branch resistor and the first SCR cathode, for substantially providing a short circuit across the first and second gating branch resistors in response to charging of the timing capacitor to a preselected level.

2. The motor starting circuit of claim 1 wherein the first SCR turn-off means is a second SCR having the anode thereof connected to the junction of the second and third gating branch resistors, having the cathode thereof connected to the junction of the first SCR cathode and the first gating branch resistor and having the gate thereof connected to the junction of the timing resistor and timing capacitor.

3. A motor starting circuit for momentarily energizing the starting winding circuit of a single-phase, alternating current motor, comprising:
   a triac connected, via the main terminals thereof, in series with said starting winding circuit; and
   a switching circuit having first and second input terminals and a gate terminal, wherein the switching circuit is connected, via the input terminals thereof, in parallel with the serially connected triac and starting winding circuit, the second input terminal of the switching circuit being connected to a main terminal of the triac with the opposite main terminal thereof connected to the starting winding circuit, wherein the gate terminal of the switching circuit is connected to the gate of the triac, and wherein the switching circuit comprises:

a biasing resistor connected between the gate terminal and the second input terminal of the switching circuit, and timing means, connected between the first input terminal of the switching circuit and the gate terminal thereof for establishing a relatively low effective resistance between the first input terminal and the triac gate for a preselected time period following connection of the motor to an electrical source and thereafter establishing a relatively high effective resistance between the first input terminal and the triac gate, said timing means including:

a full-wave rectifier bridge having the input terminals thereof connected between the first input terminal of the switching circuit and the gate terminal of the switching circuits;

a load resistor having one end thereof connected to one output terminal of the rectifier bridge;

a first SCR connected between the load resistor and the other output terminal of the rectifier bridge so as to substantially provide a short circuit between the load resistor and said other output terminal of the rectifier bridge at such time that the first SCR is gated into a conducting state;

a first SCR gating branch comprising:

a first gating branch resistor connected between the cathode and gate of said first SCR;

a second gating branch resistor having one end thereof connected to the junction of the first gating branch resistor and the gate of said first SCR; and a third gating branch resistor connected between the other end of the second gating branch resistor and the end of the load resistor connected to the rectifier bridge, wherein the third gating branch resistor has a resistance which is large in relation to the resistance of the load resistor;

a timing branch, comprising:

a timing resistor having one end thereof connected to the end of the load resistor connected to the rectifier bridge; and a timing capacitor connected between the other end of the timing resistor and the cathode of said first SCR for charging through the timing resistors; and turn-off means, connected between the junction of the timing resistor and timing capacitor, the junction of the second and third gating branch resistors, and the junction of the first gating branch resistor and the first SCR cathode, for substantially providing a short circuit across the first and second gating branch resistors in response to charging of the timing capacitor to a preselected level.

4. The motor starting circuit of claim 3 wherein the turn-off means is a second SCR having the anode thereof connected to the junction of the second and third gating branch resistors, having the cathode thereof connected to the junction of the first SCR cathode and the first gating branch resistor and having the gate thereof connected to the junction of the timing resistor and timing capacitor.

5. A motor starting circuit for momentarily energizing the starting winding circuit of a single-phase, alternating current motor, comprising:

a triac connected, via the main terminals thereof, in series with said starting winding circuit; and a switching circuit having first and second input terminals and a gate terminal, wherein the switching circuit is connected, via the input terminals thereof, in parallel with the serially connected triac and starting winding circuit, the second input terminal of the switching circuit being connected to a main terminal of the triac with the opposite main terminal thereof connected to the starting winding circuit, wherein the gate terminal of the switching circuit is connected to the gate of the triac, and wherein the switching circuit comprises:

a biasing resistor connected between the gate terminal and the second input terminal of the switching circuit; and timing means, connected between the first input terminal of the switching circuit and the gate terminal thereof for establishing a relatively low effective resistance between the first input terminal and the triac gate for a preselected time period following connection of the motor to an electrical source and thereafter establishing a relatively high effective resistance between the first input terminal and the triac gate, said timing means including:

a voltage limiter having one electrode thereof connected to the first input terminal of the switching circuit;

a full-wave rectifier bridge having the input terminals thereof connected between the other electrode of the glow discharge tube and the gate terminal of the switching circuit;

a load resistor having one end thereof connected to an output terminal of the rectifier bridge;

a first SCR connected between the load resistor and the other ouput terminal of the rectifier bridge so as to substantially provide a short circuit between the load resistor and said other output terminal of the rectifier bridge at such times that the first SCR is gated into a conducted state;

a first SCR gating branch, comprising:

a first gating branch resistor connected between the cathode and gate of said first SCR;

a second gating branch resistor having one end thereof connected to the junction of the first gating branch resistor and the gate of said first SCR; and a third gating branch resistor connected between the other end of the second gating branch resistor and the end of the load resistor connected to the rectifier bridge, wherein the third gating branch resistor has a resistance which is large in relation to the resistance of the load resistor;

a timing branch, comprising:

a timing resistor having one end thereof connected to the end of the load resistor connected to the rectifier bridge; and a timing capacitor connected between the other end of the timing resistor and the cathode of said first SCR for charging through the timing resistor; and turn-off means, connected between the junction of the timing resistor and timing capacitor, the junction of the second and third gating branch resistors, and the junction of the first gating branch resistor and the first SCR cathode, for substantially providing a short circuit across the first and second gating branch resistors in response to charging of the timing capacitor to a preselected level.

6. The motor starting circuit of claim 5 wherein the turn-off means is a second SCR having the anode thereof connected to the junction of the second and third gating branch resistors, having the cathode thereof connected to the junction of the first SCR cathode and the first gating branch resistor and having the gate thereof connected to the junction of the timing resistor and timing capacitor.

7. The motor starting circuit of claims 1, 3, or 5 wherein the turn-off means is:

a second SCR having the anode thereof connected to the junction of the second and third gating branch resistors and having the cathode thereof connected to the junction of the first SCR cathode and the first gating branch resistor;

a zener diode having the anode thereof connected to the gate of said second SCR and the cathode thereof connected to the junction of the timing resistor and timing capacitor.

8. The motor starting circuit of claims 1, 3, or 5 wherein the turn-off means is:

a second SCR having the anode thereof connected to the cathodes of a pair of diodes, the cathode of second SCR being connected to the junction of the first SCR cathode and the first gating branch resistor and having the gate thereof connected to the junction of the timing resistor and timing capacitor, one of said pair of diodes having its anode connected to the junction of the second and third gating branch resistors and the other of said pair of diodes having its anode connected to the junction of the timing resistor and timing capacitor.

9. The motor starting circuit of claims 1, 3, or 5 wherein the turn-off means is:

a second SCR having the cathode thereof connected to the junction of the first SCR cathode and the first gating branch resistor;

a zener diode having its anode connected to the gate of said second SCR and its cathode connected to the gate of said second SCR and its cathode connected to the junction of the timing resistor and timing capacitor, the anode of said second SCR connected to the cathodes of a pair of diodes, the anode of one of said pair of diodes connected to the junction of the second and third gating branch resistors, the other said pair of diodes having its anode connected to the junction of the timing resistor and timing capacitor.

10. A motor starting circuit for momentarily energizing the starting winding circuit of a single-phase, alternating current motor, comprising:

a triac connected, via the main terminals thereof, in series with said starting winding circuit; and a switching circuit having first and second input terminals and a gate terminal, wherein the switching circuit is connected, via the input terminals thereof, in parallel with the serially connected triac and starting winding circuit, the second input terminal of the switching circuit being connected to a main terminal of the triac with the opposite main terminal thereof connected to the starting winding circuit, wherein the gate terminal of the switching circuit is connected to the gate of the triac, and wherein the switching circuit comprises:

a biasing resistor connected between the gate terminal and the second input terminal of the switching circuit, and timing means, connected between the first input terminal of the switching circuit and the gate terminal thereof for establishing a relatively low effective resistance between the first input terminal and the triac gate for a preselected time period following connection of the motor to an electrical source and thereafter establishing a relatively high effective resistance between the first input terminal and the triac gate, said timing means including:

a load resistor having one end thereof connected to the first input terminal of the switching circuit;

a full-wave rectifer bridge having the input terminals thereof connected between the other end of the load resistor and the gate terminal of the switching circuit;

a first SCR connected in parallel across the output terminals of the rectifier bridge so as to substantially provide a short circuit between the load resistor and the gate terminal of the switching circuit at such time that the first SCR is in a conducting state;

a first SCR gating branch, comprising:

a first gating branch resistor connected between the cathode and gate of said first SCR;

a zener diode having its anode connected to the junction of the first gating branch resistor and a gate of said first SCR; and a second gating branch resistor connected between the cathode of said zener diode and the anode of said first SCR, wherein the second gating branch resistor has a resistance which is large in relation to the resistance of the load resistor;

a timing branch, comprising:

a timing resistor having one end thereof connected to the anode of said first SCR; and a timing capacitor connected between the other end of the timing resistor and the cathode of said SCR for charging through the timing resistor; and turn-off means, connected between the junction of the timing resistor and timing capacitor, the junction of said zener diode and second gating branch resistor, and the junction of the first gating branch resistor and the first SCR cathode, for substantially providing a short circuit across the first gating branch resistor and said zener diode in response to charging of the timing capacitor to a preselected level.

11. A motor starting circuit for momentarily energizing the starting winding circuit of a single-phase, alternating current motor, comprising:

a triac connected, via the main terminals thereof, in series with said starting winding circuit; and a switching circuit having first and second input terminals and a gate terminal, wherein the switching circuit is connected, via the input terminals thereof, in parallel with the serially connected triac and starting winding circuit, the second input terminal of the switching circuit being connected to a main terminal of the triac with the opposite main terminal thereof connected to the starting winding circuit, wherein the gate terminal of the switching circuit is connected to the gate of the triac, and wherein the switching circuit comprises:

a biasing resistor connected between the gate terminal and the second input terminal of the switching circuit, and timing means, connected between the first input terminal of the switching circuit and the gate terminal thereof for establishing a relatively low effective resistance between the first input terminal and the triac gate for a preselected time period following connection of the motor to an electrical source and thereafter establishing a relatively high effective resistance between the first input terminal and the triac gate, said timing means including:

a full-wave rectifier bridge having the input terminals thereof connected between the first input terminal of the switching circuit and the gate terminal of the switching circuits;

a load resistor having one end thereof connected to one output terminal of the rectifier bridge;

a first SCR connected between the load resistor and the other output terminal of the rectifier bridge so as to substantially provide a short circuit between the load resistor and said other output terminal of the rectifier bridge at such time that the first SCR is gated into a conducting state;

a first SCR gating branch comprising:

a first gating branch resistor connected between the cathode and gate of said first SCR;

a zener diode having its anode connected to the junction of the first gating branch resistor and the gate of said first SCR; and a second gating branch resistor connected between the cathode of said zener diode and the end of the load resistor connected to the rectifier bridge, wherein the second gating branch resistor has a resistance which is large in relation to the resistance of the load resistor;

a timing branch, comprising:

a timing resistor having one end thereof connected to the end of the load resistor connected to the rectifier bridge; and a timing capacitor connected between the other end of the timing resistor and the cathode of said first SCR for charging through the timing resistors; and turn-off means, connected between the junction of the timing resistor and timing capacitor, the junction of said zener diode and second gating branch resistor, and the junction of the first gating branch resistor and the first SCR cathode, for substantially providing a short circuit across the first gating branch resistor and said zener diode in response to charging of the timing capacitor to a preselected level.

12. A motor starting circuit for momentarily energizing the starting winding circuit of a single-phase, alternating current motor, comprising:

a triac connected, via the main terminals thereof, in series with said starting winding circuit; and a switching circuit having first and second input terminals and a gate terminal, wherein the switching circuit is connected, via the input terminals thereof, in parallel with the serially connected triac and starting winding circuit, the second input terminal of the switching circuit being connected to a main terminal of the triac with the opposite main terminal thereof connected to the starting winding circuit, wherein the gate terminal of the switching circuit is connected to the gate of the triac, and wherein the switching circuit comprises:

a biasing resistor connected between the gate terminal and the second input terminal of the switching circuit, and timing means, connected between the first input terminal of the switching circuit and the gate terminal thereof for establishing a relatively low effective resistance between the first input terminal and the triac gate for a preselected time period following connection of the motor to an electrical source and thereafter establishing a relatively high effective resistance between the first input terminal and the triac gate, said timing means including:

a voltage limiter having one electrode thereof connected to the first input terminal of the switching circuit;

a full-wave rectifier bridge having the input terminals thereof connected between the other electrode of the glow discharge tube and the gate terminal of the switching circuit;

a load resistor having one end thereof connected to an output terminal of the rectifier bridge;

a first SCR connected between the load resistor and the other output terminal of the rectifier bridge so as to substantially provide a short circuit between the load resistor and said other output terminal of the rectifier bridge at such times that the first SCR is gated into a conducted state;

a first SCR gating branch, comprising:

a first gating branch resistor connected between the cathode and gate of said first SCR;

a zener diode having its anode connected to the junction of the first gating branch resistor and the gate of said first SCR; and a second gating branch resistor connected between the cathode of said zener diode and the end of the load resistor connected to the rectifier bridge, wherein the second gating branch resistor has a resistance which is large in relation to the resistance of the load resistor;

a timing branch, comprising:

a timing resistor having one end thereof connected to the end of the load resistor connected to the rectifier bridge; and a timing capacitor connected between the other end of the timing resistor and the cathode of said first SCR for charging through the timing resistor; and turn-off means, connected between the junction of the timing resistor and timing capacitor, the junction of said zener diode and second gating branch resistor, and the junction of the first gating branch resistor and the first SCR cathode, for substantially providing a short circuit across the first gating branch resistor and said zener diode in response to charging of the timing capacitor to a preselected level.

13. The motor starting circuit of claims 10, 11, or 12 wherein the turn-off means is:

a second SCR having the anode thereof connected to the junction of said first mentioned zener diode and second gating branch resistor and having the cathode thereof connected to the junction of the first SCR cathode and the first gating branch resistor, a second zener diode having the anode thereof connected to the gate of said second SCR and the cathode thereof connected to the junction of the timing resistor and timing capacitor.

14. The motor starting circuit of claims 10, 11, or 12 wherein the turn-off means is:

a second SCR having the anode thereof connected to the cathodes of a pair of diodes, the cathode of second SCR being connected to the junction of the first SCR cathode and the first gating branch resistor and having the gate thereof connected to the junction of the timing resistor and timing capacitor, one of said pair of diodes having its anode connected to the junction of said zener diode and second gating branch resistor and the other of said pair of diodes having its anode connected to the junction of the timing resistor and timing capacitor.

15. The motor starting circuit of claims 10, 11, or 12 wherein the turn-off means is:

a second SCR having the cathode thereof connected to the junction of the first SCR cathode and the first gating branch resistor, a second zener diode having its anode connected to the gate of said second SCR and its cathode connected to the junction of the timing resistor and timing capacitor, the anode of said second SCR connected to the cathodes of a pair of diodes, the anode of one of said pair of diodes connected to the junction of said first mentioned zener diode and second gating branch resistor, the other of said pair of diodes having its anode connected to the junction of the timing resistor and timing capacitor.

* * * * *

UNITED STATES PATENT AND TRADEMARK OFFICE
CERTIFICATE OF CORRECTION

PATENT NO. : 4,468,604
DATED : August 28, 1984
INVENTOR(S) : Andrew Zaderej

It is certified that error appears in the above-identified patent and that said Letters Patent are hereby corrected as shown below:

Column 13, lines 50 and 51, delete "and its cathode connected to the gate of said second SCR"; line 57, after "other," add "of," all in Claim 9.

Column 15, line 25, delete "circuits." and substitute "circuit"; line 54, delete "resistors" and substitute "resistor," all in Claim 11.

Signed and Sealed this

Seventh Day of January 1986

[SEAL]

Attest:

DONALD J. QUIGG

Attesting Officer

Commissioner of Patents and Trademarks